United States Patent
Feugnet et al.

(10) Patent No.: US 7,561,275 B2
(45) Date of Patent: Jul. 14, 2009

(54) SCALE-FACTOR STABILIZED SOLID-STATE LASER GYROSCOPE

(75) Inventors: Gilles Feugnet, Les Ulis (FR); Sylvain Schwartz, Paris (FR); Jean-Paul Pocholle, La Norville (FR); Christian Larat, Paris (FR); Francois Gutty, Chatellerault (FR)

(73) Assignee: Thales (FR)

(*) Notice: Subject to any disclaimer, the term of this patent is extended or adjusted under 35 U.S.C. 154(b) by 93 days.

(21) Appl. No.: 11/576,838

(22) PCT Filed: Oct. 6, 2005

(86) PCT No.: PCT/EP2005/055035

§ 371 (c)(1), (2), (4) Date: Apr. 6, 2007

(87) PCT Pub. No.: WO2006/037795

PCT Pub. Date: Apr. 13, 2006

(65) Prior Publication Data

US 2008/0037026 A1    Feb. 14, 2008

(30) Foreign Application Priority Data

Oct. 8, 2004    (FR) .................. 04 10659

(51) Int. Cl.
G01C 19/66    (2006.01)

(52) U.S. Cl. ................................. 356/459

(58) Field of Classification Search .......... 356/459–476
See application file for complete search history.

(56) References Cited

U.S. PATENT DOCUMENTS

| | | | |
|---|---|---|---|
| 4,657,391 A | 4/1987 | Rodloff et al. | |
| 4,708,479 A | 11/1987 | Dye et al. | |
| 5,241,555 A | 8/1993 | Spitzer et al. | |
| 5,367,377 A * | 11/1994 | Rahn | 356/467 |
| 6,373,048 B1 * | 4/2002 | Tschanun | 250/231.12 |
| 6,614,818 B1 | 9/2003 | Kmetec et al. | |

FOREIGN PATENT DOCUMENTS

| | | | |
|---|---|---|---|
| FR | 2550623 A1 | 2/1985 |
| FR | 2562342 A1 | 10/1985 |
| FR | 2825463 A1 | 12/2002 |

* cited by examiner

*Primary Examiner*—Hwa S Lee (Andrew)
(74) *Attorney, Agent, or Firm*—Lowe Hauptman Ham & Berner, LLP

(57) ABSTRACT

A laser cavity optical architecture of a solid-state laser gyro measures rotational velocity or angular position and is based on a global conservation of the scale factor so that each parameter varies with temperature and avoids optical mode hops.

9 Claims, 1 Drawing Sheet

SCALE-FACTOR STABILIZED SOLID-STATE LASER GYROSCOPE

CROSS REFERENCE TO RELATED APPLICATIONS

Figure 1:
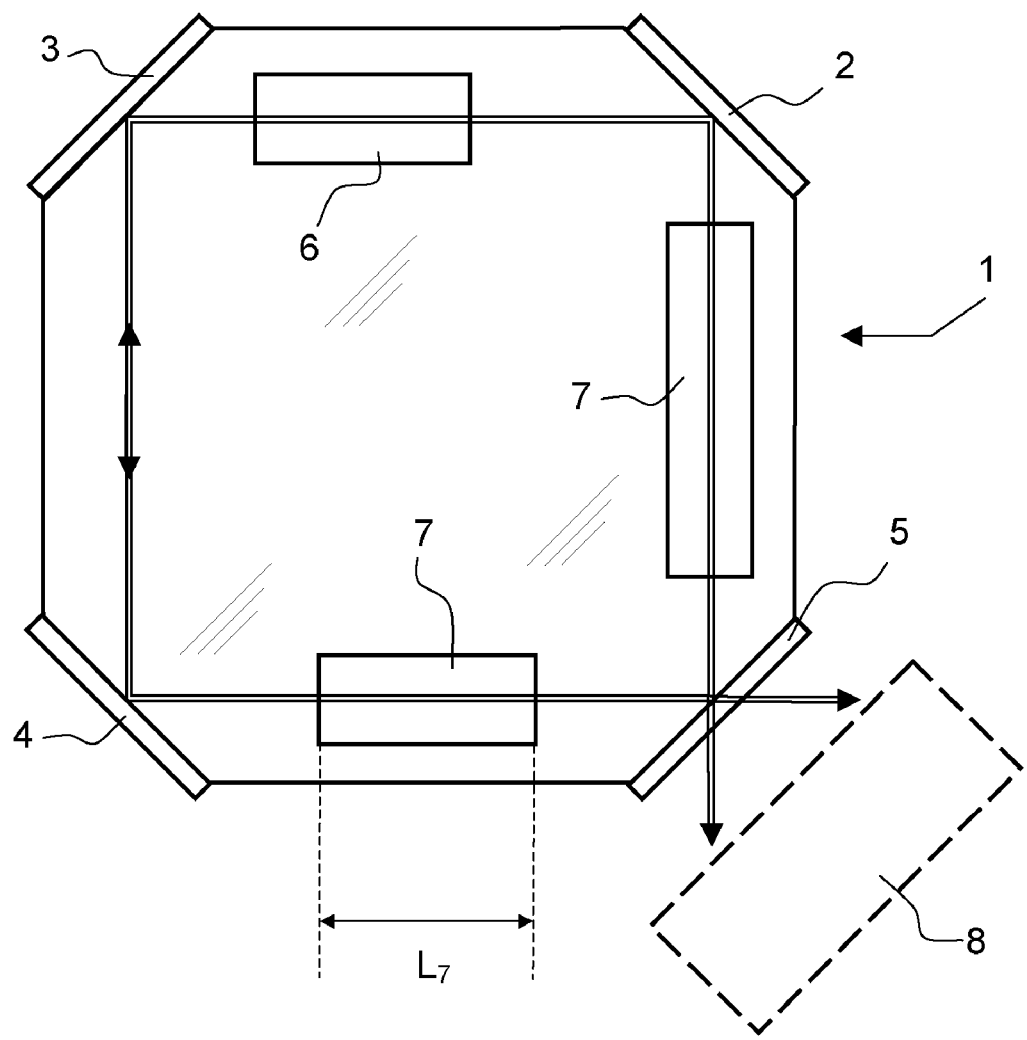

The present application is based on International Application No. PCT/EP2005/055035 filed on Oct. 6, 2005, which in turn corresponds to France Application No. 0410659 filed on Oct. 8, 2004, and priority is hereby claimed under 35 USC 119 based on these applications. Each of these applications are hereby incorporated by reference in their entirety into the present application.

The field of the invention is that of solid-state laser gyros, used for measuring rotational velocities or angular positions. This type of equipment is employed in particular for aeronautical applications.

The laser gyro, developed some thirty years ago, is widely marketed and used today. Its operating principle is based on the Sagnac effect, which induces a frequency difference $\Omega$ between the two optical emission modes propagating in opposite directions, termed counter-propagating modes, of a bidirectional ring laser cavity driven in rotation. Conventionally, the frequency difference $\Omega$ satisfies:

$$\Omega = S \cdot \overline{\omega}$$

with $S = 4A/\lambda \cdot L$ where S is called the scale factor of the laser gyro. L and A are the optical length and the area of the cavity respectively, $\lambda$ is the average wavelength of laser emission with no Sagnac effect and $\overline{\omega}$ is the angular rotation velocity of the laser gyro.

The $\Omega$ measurement obtained by spectral analysis of the beating of the two beams emitted makes it possible to ascertain the value of $\overline{\omega}$ to a very high accuracy.

By electronically counting the beat fringes that move past during a change of angular position, the relative value of the angular position of the device is also determined.

One of the factors determining the performance of a laser gyro is the temperature stability of its scale factor S.

In gas lasers of Helium/Neon type comprising a laser cavity and an amplifying medium made up of a gas mixture of helium and neon, the temperature stability of the scale factor is due to the joint stability of the wavelength, of the optical length and of the area of the cavity. Stability of the area of the cavity is obtained by using cavity supports sliced from materials with a very small expansion coefficient such as Zerodur. Stability of the laser wavelength is engendered by stability of the atomic emission wavelength. The optical length of the cavity depends on the variations in the length and the optical index of the cavity with temperature. Its stability is ensured by slaving the length of the cavity to the atomic spectral line used. Slaving is carried out by means of a piezoelectric wedge, the error signal being provided by the intensity of the light emitted by the laser.

The gaseous nature of the amplifying medium is, however, a source of technical complications during production of the laser gyro, particularly because of the high gas purity required. Moreover, it causes premature wear of the laser, this wear being due, in particular, to gas leaks, deterioration of the electrodes and the high voltages used to establish the population inversion.

Currently, it is possible to produce a solid-state laser gyro that operates in the visible or near infra-red by using, for example, an amplifying medium based on neodymium-doped YAG (Yttrium-Aluminum-Garnet) crystals in place of the helium-neon gas mixture, optical pumping then being carried out by laser diodes operating in the near infra-red. A semiconductor material, a crystalline matrix or a glass doped with ions belonging to the class of the rare earths (erbium, ytterbium, etc.) may also be used as amplifying medium. All the inherent problems of the gaseous state of the amplifying medium are thus de facto eliminated.

However, in lasers whose amplifying medium is no longer a gas but a solid, the stability of the scale factor cannot be guaranteed by means of the procedures used for gas lasers.

Specifically, the frequency of the maximum of the amplifying medium gain curve is subject to sizeable variations as the temperature varies. For example, for a laser of neodymium/YAG type, the variation in the frequency equals −1.3 gigahertz/degree at the wavelength of 1.06 microns in a temperature range between −50 degrees and +100 degrees Celsius.

It is known that the free spectral interval of a laser cavity corresponds to the spectral interval separating two frequencies capable of oscillating in the cavity. It equals c/L, c being the velocity of light in vacuo. In point of fact, in the case of cavities of conventional size, that is to say for optical lengths L equal to a few tens of centimeters, and in the case of solid-state lasers, the spectral width of the gain curve is large relative to the free spectral interval. Typically, the spectral width of the gain curve represents several tens of free spectral intervals. Under these conditions, it is no longer possible to construct a slaving of the length of the cavity having the variations in the gain curve as error signal when the length L varies, as these variations are no longer significant.

Moreover, the variations with temperature of the optical length are much bigger in solids than in gases. Indeed, the variations in geometric length due to temperature are compounded with the variations in the optical index, which are much bigger in a dense medium. Consequently, it is more difficult to compensate for them using a standard piezoelectric wedge.

In order to avoid the need to thermally compensate the scale factor, thermal sensors arranged on the laser cavity could be used to determine the temperature, then, by virtue of a mathematical model, the variation in the scale factor corresponding to the temperature measured could be deduced therefrom. It would then be possible to introduce this variation into the calculation of the angular rotation velocity. However, experience proves that models are currently not accurate enough to obtain the desired accuracy.

In the field of solid-state lasers, American patent U.S. Pat. No. 6,614,818 proposes an optical architecture that makes it possible to preserve the emission mode without mode hops by globally compensating for thermal drifts. This architecture is based on the preservation of the emitted mode number n, given by:

$$n \approx \frac{v \cdot L}{c}$$

with v being frequency of the maximum of the gain curve of the amplifying medium used in the laser and L the optical length of the cavity.

To preserve this mode number, it suffices that its variation as a function of temperature should be zero, which yields the following mathematical relation:

$$\frac{1}{v} \cdot \frac{dv}{dT} + \frac{1}{L} \cdot \frac{dL}{dT} = 0$$

This relation could not be applied as it stands to compensate for the variations in the scale factor, which is a different problem from preservation of the frequency of the emission mode. In particular, it is possible to have emission mode hops while still preserving the scale factor.

The present invention proposes an optical architecture based on global preservation of the scale factor, each parameter being able to vary with temperature.

More precisely, the subject of the invention is a laser gyro comprising at least one ring cavity of optical length L and of area A and a solid-state amplifying medium that are designed in such a way that two optical waves of average wavelength $\lambda$ can propagate in opposite directions inside the cavity, the scale factor S of the laser gyro being equal to $$\frac{4 \cdot A}{\lambda \cdot L},$$

characterized in that the variations in the average wavelength $\lambda$, in the magnitude of the area A and in the optical length L of the cavity as a function of temperature T are such that the scale factor S remains substantially constant as the temperature T varies.

Advantageously, as the cavity has a geometric perimeter $L_o$, said cavity comprising at least one optical element Oi, being an integer index varying between 1 and the total number of optical elements, the optical element Oi being of length $L_i$, of optical index $n_i$, $x_i$ being equal to the ratio $$\frac{L_i}{L_o}, \frac{dn_i}{dT}$$

being the coefficient of variation as a function of temperature T of the optical index $n_i$ of the optical element Oi, $\alpha_i$ being the linear expansion coefficient of the optical element Oi, $\alpha_o$ being the linear expansion coefficient of the material serving as support for the cavity, v being the central emission frequency of the amplifying medium and $$\frac{dv}{dT}$$

being the coefficient of variation as a function of temperature T of said frequency, said optical elements and the amplifying medium are designed so that the following relation is substantially satisfied:

$$\left(2 \cdot \alpha_0 + \frac{1}{v} \cdot \frac{dv}{dT}\right)\left[1 + \sum_i (n_i - 1)x_i\right] -$$

$$\alpha_0 - \sum_i (n_i - 1)x_i \cdot \alpha_i - \sum_i \frac{dn_i}{dT} x_i = 0$$

Advantageously, to prevent optical mode hops occurring, the optical elements and the amplifying medium are designed so that the following relations are substantially and simultaneously satisfied:

$$\alpha_0 = -\frac{1}{v} \cdot \frac{dv}{dT} \text{ and } \sum_i \left[\frac{dn_i}{dT} - (n_i - 1) \cdot (\alpha_0 - \alpha_i)\right] x_i = 0$$

Finally, the cavity can comprise at least one material of which the coefficient of variation of the optical index as a function of temperature T is negative. Also, the cavity may comprise one or more thermal sensors and the laser gyro may comprise an electronic processing unit linked to said thermal sensors, which makes it possible to calculate the residual variations as a function of temperature of the scale factor.

The invention also relates to an angular-velocity or angular-measurement system comprising at least one laser gyro as previously described. The system can then comprise three laser gyros whose cavities are oriented so as to make measurements in three independent directions.

The invention will be better understood and other advantages will become apparent on reading the following description, given without limitation, and by virtue of the appended FIG. 1, which represents a basic diagram of a laser gyro according to the invention.

FIG. 1 represents the basic diagram of a laser gyro according to the invention. It comprises:
- a cavity 1 made of a first material and comprising several reflecting mirrors 2, 3 and 4 and a partially reflecting mirror 5;
- an amplifying medium 6;
- at least one optical element 7 of length $L_7$;
- the whole assembly being designed so that two optical waves can propagate in two opposite directions inside the cavity. These two waves are represented by a double line in FIG. 1. These waves pass through the various optical elements arranged in the cavity;
- and an opto-electronic measurement device 8 represented by a dashed line, which makes it possible to calculate the angular parameter measured on the basis of the interference pattern of the two counter-propagating waves coming from the partially reflecting mirror 5.

As stated, the scale factor of the laser gyro S satisfies with the same notation as previously: $S = 4A/\lambda \cdot L$ It is possible to replace the wavelength $\lambda$ with the associated frequency v. The new expression for the scale factor S is then obtained, which now equals:

$$S = \frac{4A \cdot v}{c \cdot L}$$

The coefficient H, which equals:

$$H = \frac{A}{L_o^2}$$

with $L_O$ being the geometric perimeter of the cavity, is called the aspect ratio.

H is a dimensionless parameter substantially independent of temperature. This is satisfied in particular if the external constraints experienced by the cavity comply with the latter's symmetries. A is then replaced with $HL_0^2$ in the expression for S to obtain:

$$S = \frac{4H \cdot L_0^2 \cdot v}{c \cdot L}$$

The cavity comprises n optical elements Oi indexed, i being an integer index varying between 1 and the total number n of optical elements, each optical element Oi being of length $L_i$ and of optical index $n_i$. Consequently the following relation holds:

$$L = L_O + \sum_i (n_i - 1) \cdot L_i$$

The new expression for the scale factor S may then be written:

$$S = \frac{4H \cdot L_0^2 \cdot v}{c \cdot \left(L_O + \sum_i (n_i - 1)L_i\right)}$$

The stability condition for the scale factor as a function of temperature may be written:

$$\frac{dS}{dT} = 0, \text{ or}$$

$$\left(2L_0 \frac{dL_0}{dT} v + L_0^2 \frac{dv}{dT}\right)\left[L_0 + \sum_i (n_i - 1)L_i\right] -$$

$$L_0^2 \cdot v \cdot \left(\frac{dL_0}{dT} + \sum_i (n_i - 1)\frac{dL_i}{dT} + \sum_i \frac{dn_i}{dT} \cdot L_i\right) = 0$$

which gives, after dividing by $v \cdot L_0^3$.

$$\left(\frac{2}{L_0}\frac{dL_0}{dT} + \frac{1}{v}\frac{dv}{dT}\right)\left[1 + \sum_i (n_i - 1)\frac{L_i}{L_0}\right] -$$

$$\frac{1}{L_0}\frac{dL_0}{dT} - \sum_i \frac{n_i - 1}{L_0}\frac{dL_i}{dT} - \sum_i \frac{dn_i}{dT}\frac{L_i}{L_0} = 0$$

By putting $$x_i = \frac{L_i}{L_0},$$

the following is obtained:

$$\left(\frac{2}{L_0}\frac{dL_0}{dT} + \frac{1}{v}\frac{dv}{dT}\right)\left[1 + \sum_i (n_i - 1)x_i\right] -$$

$$\frac{1}{L_0}\frac{dL_0}{dT} - \sum_i \frac{(n_i - 1)x_i}{L_i}\frac{dL_i}{dT} - \sum_i \frac{dn_i}{dT} x_i = 0$$

The expansion coefficients of the various optical elements equal:

$$\alpha_i = \frac{1}{L_i}\frac{dL_i}{dT}.$$

By introducing them into the above expression, the following is obtained:

$$\left(2\alpha_0 + \frac{1}{v}\frac{dv}{dT}\right)\left[1 + \sum_i (n_i - 1)x_i\right] - \alpha_0 - \sum_i (n_i - 1)x_i\alpha_i - \sum_i \frac{dn_i}{dT} x_i = 0$$

which is indeed the expression as claimed, called relation 1.

In the simple case where the cavity comprises only a single optical element, which serves as amplifying medium, said element having an optical index n, a total length L and an expansion coefficient α, the above relation may now be written:

$$\left(2\alpha_0 + \frac{1}{v}\frac{dv}{dT}\right)[1 + (n - 1)x] - \alpha_0 - (n - 1)\alpha x - \frac{dn}{dT} x = 0$$

In this case, x therefore equals:

$$x = \frac{\alpha_0 + \frac{1}{v}\frac{dv}{dT}}{\frac{dn}{dT} + (n - 1)\left(\alpha - 2\alpha_0 - \frac{1}{v}\frac{dv}{dT}\right)}$$

By way of example, if the amplifying medium is neodymium-YAG working at the wavelength of 1.06 microns, then
  the optical index n is equal to 1.82;
  the linear expansion coefficient α is equal to 7.6 ppm per degree, ppm signifying parts per million;
  the coefficient of variation of the optical index as a function of temperature is equal to 7.3 ppm per degree;
  the coefficient of variation of the frequency $$\frac{1}{v}\frac{dv}{dT}$$

is equal to −4.6 ppm per degree,
  and x represents the percentage of amplifying medium present in the cavity.
  In this case, x is equal to:

$$x = \frac{\alpha_0 - 4.6}{17.3 - 1.64\alpha_0}$$

x must lie between 0 and 1. Consequently, it suffices that the coefficient of expansion of the material $\alpha_0$ should satisfy: 4.6 ppm·K$^{-1}$ < $\alpha_0$ < 8.3 ppm·K$^{-1}$ for it to be it possible to find a suitable length of neodymium-YAG enabling the scale factor to be made almost independent of temperature.

The above relation 1 makes it possible to preserve a constant scale factor. For certain applications, it may be beneficial to avoid disturbing the operation of the laser gyro by mode hops and to preserve a temperature-independent emitted mode number, thus yielding the following mathematical relation:

$$\frac{1}{v} \cdot \frac{dv}{dT} + \frac{1}{L} \cdot \frac{dL}{dT} = 0$$

By using the same notation as previously, this relation may also be written:

$$\left[L_0 + \sum_i (n_i - 1)L_i\right] \frac{1}{v} \frac{dv}{dT} + \frac{dL_0}{dT} L_i + \sum_i \frac{dn_i}{dT} L_i + \sum_i (n_i - 1) \frac{dL_i}{dT} = 0$$

which becomes, after dividing by $L_0$, $$\left[1 + \sum_i (n_i - 1)x_i\right] \frac{1}{v} \frac{dv}{dT} + \alpha_0 + \sum_i \frac{dn_i}{dT} x_i + \sum_i (n_i - 1)x_i \alpha_i = 0$$

The latter relation is called relation 2.

The conditions for relations 1 and 2 to be simultaneously satisfied are:

$$\begin{cases} \alpha_0 = -\frac{1}{v} \cdot \frac{dv}{dT} \\ \sum_i \left[\frac{dn_i}{dT} - (n_i - 1)(\alpha_0 - \alpha_i)\right] x_i = 0 \end{cases}$$

These conditions are called relations 3 and 4.

If the cavity comprises only a single optical element, relations 3 and 4 above cannot necessarily be satisfied. If the cavity comprises at least two optical elements, it becomes easier to satisfy these two relations simultaneously. Indeed, with two optical elements, relations 3 and 4 may be written:

$$\begin{cases} \alpha_0 = -\frac{1}{v} \cdot \frac{dv}{dT} \\ \left[\frac{dn_1}{dT} - (n_1 - 1)(\alpha_0 - \alpha_1)\right] x_1 + \left[\frac{dn_2}{dT} - (n_2 - 1)(\alpha_0 - \alpha_2)\right] x_2 = 0 \end{cases}$$

By way of example, if material 1 is Nd:YAG, serving as amplifying medium, conditions 3 and 4 become:

$$\begin{cases} \alpha_0 = 4.6\,ppm \cdot K^{-1} \\ 9.76 \cdot x_1 + \left[\frac{dn_2}{dT} - (n_2 - 1)(\alpha_0 - \alpha_2)\right] x_2 = 0 \end{cases}$$

It is possible to find a material satisfying condition 3 since this expansion coefficient is typical of standard borosilicate-type glasses.

$x_1$ and $x_2$ necessarily being positive, relation 4 implies that:

$$\frac{dn_2}{dT} - (n_2 - 1)(4.6 - \alpha_2) < 0$$

This condition can be fulfilled for certain glasses. By way of non-limiting example, the characteristics of the reference glass PK51A from the Schott company are:

$\alpha_2 = 12.7\ ppm \cdot K^{-1}$ $dn_2/dT = -7\ ppm \cdot K^{-1}$ $n_2 = 1.5$ Also, consequently, $$\frac{dn_2}{dT} - (n_2 - 1)(4.6 - \alpha_2) = -3\,ppm \cdot K^{-1},$$

thus satisfying the above condition.

With this reference glass PK51A, relation 4 may then be written:

$9.76 \cdot x_1 - 3 \cdot x_2 = 0$ or $x_1/x_2 = 0.3$

For example, if the YAG rod used for the amplification has a length of 5 centimeters, then a 16-centimeter rod of PK51β permits thermal compensation, the cavity being itself made of a material whose expansion coefficient equals 4.6 ppm·K$^{-1}$, which is typically representative of a glass.

Thus, a judicious choice of materials makes it possible to compensate in large part for the thermal drift, acting on the scale factor and also on the optical modes.

Of course, in the case where the expansion coefficients or the coefficients of variation of the optical index as a function of temperature are not perfectly linear, and in the case also where the temperature is not uniformly distributed in the cavity enclosure, it is possible to refine the measurement of the laser gyro scale factor by means of a mathematical model that determines the small variations in the scale factor as a function of thermal variations. In such a case, temperature sensors are placed in the cavity enclosure.

The laser gyro according to the invention can apply to any angular-velocity or angular-measurement system. The system can comprise, in particular, three laser gyros whose cavities are oriented so as to make measurements in three different directions, thus making it possible to ascertain the three angular components of a position or of a velocity.

The invention claimed is:

1. A laser gyro, comprising: a ring cavity of optical length L and of area A, and a solid-state amplifying medium wherein two optical waves of average wavelength λ propagate in opposite directions inside the cavity, the scale factor S of the laser gyro being equal to $$\frac{4 \cdot A}{\lambda \cdot L},$$

wherein the cavity has a geometric perimeter $L_o$, said cavity comprising at least one optical element Oi traversed by the optical waves, i being an integer index varying between 1 and the total number of optical elements, the optical element Oi having length $L_i$, optical index $n_i$, $x_i$ being equal to the ratio $$\frac{L_i}{L_o}, \frac{dn_i}{dT}$$

being the coefficient of variation as a function of temperature T of the optical index $n_i$ of the optical element Oi, $\alpha_i$ being the linear expansion coefficient of the optical element Oi, $\alpha_0$ being the linear expansion coefficient of the constituent material of the cavity, v being the central emission frequency of the amplifying medium and $$\frac{dv}{dT}$$

being the coefficient of variation as a function of temperature T of said frequency, said optical elements and the amplifying medium are designed so that the following relation is substantially satisfied:

$$\left(2\cdot\alpha_0 + \frac{1}{v}\cdot\frac{dv}{dT}\right)\left[1 + \sum_i (n_i - 1)x_i\right] - \alpha_0 - \sum_i (n_i - 1)x_i \cdot \alpha_i - \sum_i \frac{dn_i}{dT}x_i = 0.$$

2. The laser gyro as claimed in claim 1, wherein the optical elements and the amplifying medium are designed so that the following relations are substantially and simultaneously satisfied:

$$\alpha_0 = -\frac{1}{v}\cdot\frac{dv}{dT}$$

and $$\sum_i \left[\frac{dn_i}{dT} - (n_i - 1)\cdot(\alpha_0 - \alpha_i)\right] = x_i = 0.$$

3. The laser gyro as claimed in claim 1, wherein the cavity comprises at least one material of which the coefficient of variation of the optical index as a function of temperature T is negative.

4. The laser gyro as claimed in claim 1, wherein the cavity comprises at least one thermal sensor and the laser gyro comprises an associated electronic processing unit linked to said thermal sensor, which makes it possible to calculate the residual variations as a function of temperature of the scale factor.

5. An angular-measurement system, comprising one ring cavity of optical length L and of area A, and a solid-state amplifying medium that are designed in such a way that two optical waves of average wavelength $\lambda$ propagate in opposite directions inside the cavity, the scale factor S of the laser gyro being equal to $$\frac{4\cdot A}{\lambda \cdot L},$$

wherein as the cavity has a geometric perimeter $L_o$, said cavity comprising at least one optical element traversed by the optical waves, i being an integer index varying between 1 and the total number of optical elements, the optical element Oi being of length $L_i$, of optical index $n_i$, $x_i$ being equal to the ratio $$\frac{L_i}{L_O}, \frac{dn_i}{dT}$$

being the coefficient of variation as a function of temperature T of the optical index $n_i$ of the optical element Oi, $\alpha_i$ being the linear expansion coefficient of the optical element Oi, $\alpha_0$ being the linear expansion coefficient of the constituent material of the cavity, v being the central emission frequency of the amplifying medium and $$\frac{dv}{dT}$$

being the coefficient of variation as a function of temperature T of said frequency, said optical elements and the amplifying medium are designed so that the following relation is substantially satisfied:

$$\left(2\cdot\alpha_0 + \frac{1}{v}\cdot\frac{dv}{dT}\right)\left[1 + \sum_i (n_i - 1)x_i\right] - \alpha_0 - \sum_i (n_i - 1)x_i \cdot \alpha_i - \sum_i \frac{dn_i}{dT}x_i = 0.$$

6. The measurement system as claimed in claim 5, comprising three laser gyros whose cavities are oriented so as to make measurements in three different directions.

7. The laser gyro as claimed in claim 1, wherein the cavity comprises at least one material of which the coefficient of variation of the optical index as a function of temperature T is negative.

8. The laser gyro as claimed in claim 1, wherein the cavity comprises at least one thermal sensor and the laser gyro comprises an associated electronic processing unit linked to said thermal sensor, which makes it possible to calculate the residual variations as a function of temperature of the scale factor.

9. The laser gyro as claimed in claim 2, wherein the cavity comprises at least one thermal sensor and the laser gyro comprises an associated electronic processing unit linked to said thermal sensor, which makes it possible to calculate the residual variations as a function of temperature of the scale factor.

* * * * *